(12) United States Patent
Lind (10) Patent No.: US 6,497,538 B1
(45) Date of Patent: Dec. 24, 2002

(54) DEVICE OF A TOOL SPINDLE

(75) Inventor: Björn Lind, Billdal (SE)

(73) Assignee: Lind Finance & Development AB, Göteborg (SE)

( * ) Notice: Subject to any disclaimer, the term of this patent is extended or adjusted under 35 U.S.C. 154(b) by 0 days.

(21) Appl. No.: 09/937,064

(22) PCT Filed: Jan. 19, 2000

(86) PCT No.: PCT/SE00/00102

§ 371 (c)(1),
(2), (4) Date: Sep. 20, 2001

(87) PCT Pub. No.: WO00/59663

PCT Pub. Date: Oct. 12, 2000

(30) Foreign Application Priority Data

Mar. 23, 1999 (SE) ................................. 9901049

(51) Int. Cl.7 ............................. B23C 1/06; B23Q 11/12
(52) U.S. Cl. ......................... 409/135; 408/56; 409/231; 409/233
(58) Field of Search ................... 409/136, 135, 409/231; 279/233, 141; 82/1, 2; 408/56, 230, 239 A, 239 R; 310/54, 61

(56) References Cited

U.S. PATENT DOCUMENTS

| 4,137,997 A | * | 2/1979 | Ando | 184/6.22 |
|---|---|---|---|---|
| 4,693,642 A | * | 9/1987 | Mair et al. | 408/59 |
| 5,020,635 A | * | 6/1991 | Lunn | 184/6.12 |
| 5,345,847 A | * | 9/1994 | Weller | 414/14 |
| 5,540,526 A | * | 7/1996 | Hyatt et al. | 408/1 R |

FOREIGN PATENT DOCUMENTS

| DE | 3731183 C1 | | 8/1988 | |
|---|---|---|---|---|
| DE | 3911769 C1 | * | 10/1989 | 409/231 |
| DE | 4015241 A1 | * | 11/1991 | 409/231 |
| EP | 0852170 A2 | | 7/1998 | |

* cited by examiner

*Primary Examiner*—William Briggs
(74) *Attorney, Agent, or Firm*—Ware, Fressola, Van der Sluys & Adolphson LLP (57) ABSTRACT

Arrangement for delivering coolant fluid to the rotating part (1,3) of a tool spindle intended to support a tool at one end. It is distinguished in that the end of the rotating part (1,3) that is opposite the tool is accommodated in a unit (4) that is stationary in relation to the rotating part (1,3), that the rotating part has an axial bore (6) of the rotating part (1,3), that a gap sealing separates the rotating part (1,3) from the stationary unit (4) adjacent to the inlet thereby forming a dynamic bearing during the rotation of the rotating part due to leakage of the coolant fluid through the gap sealing.

6 Claims, 6 Drawing Sheets

DEVICE OF A TOOL SPINDLE

BACKGROUND OF THE INVENTION

The present invention relates to a wholly new device for leading coolant fluid to the rotating part of a tool spindle 5 intended to support a tool at one end to simplify and assure the function of the spindle of the tool even at very high speeds of rotation.

BRIEF DESCRIPTION OF THE DRAWINGS

The invention will be described in more detail in the form of examples with reference to the drawings.

GENERAL DESCRIPTION OF THE TOOL SPINDLE ACCORDING TO THE INVENTION

Figure 1:
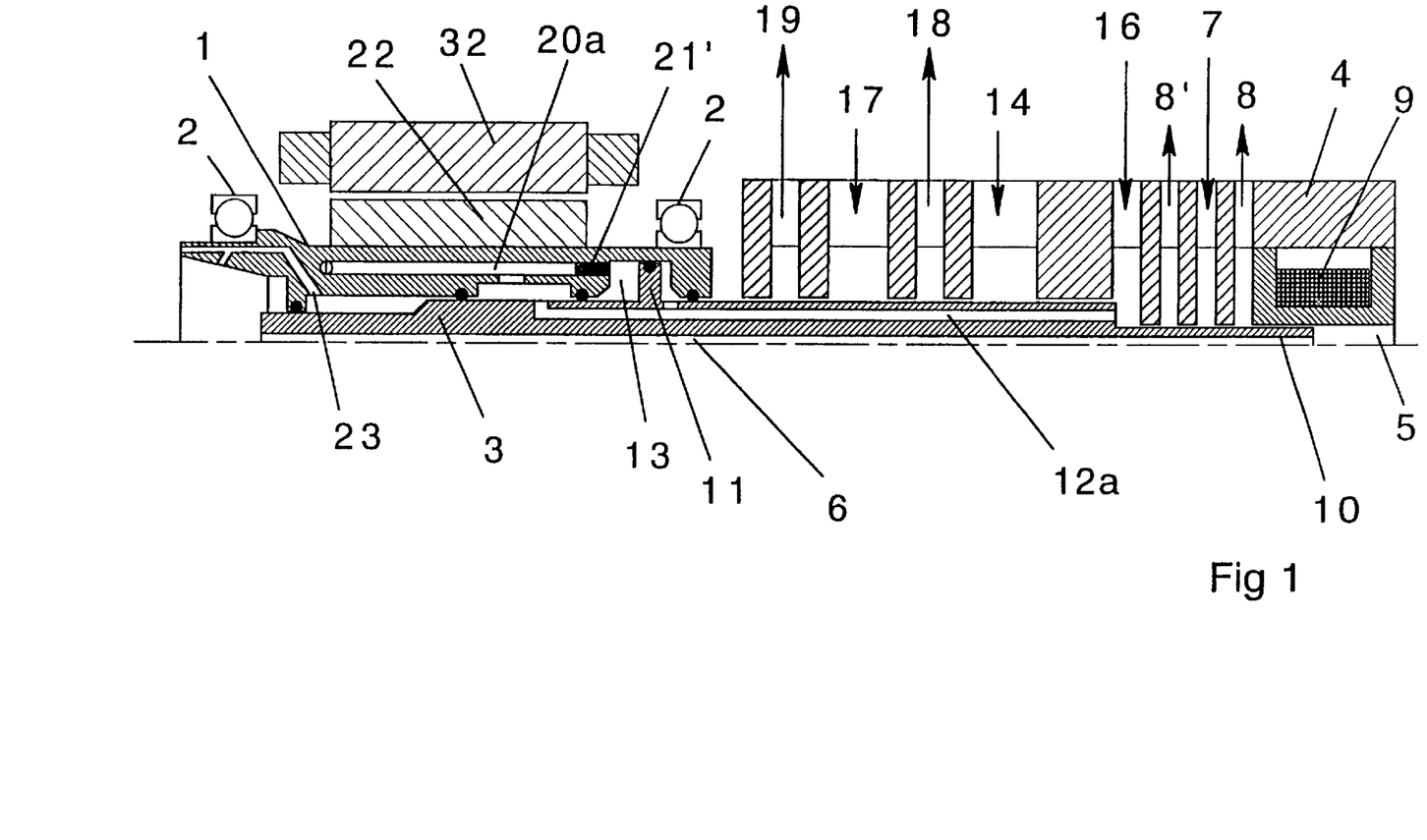
FIGS. 1–4 show schematically examples of the tool spindle according to the invention, whereby the spindle, due to its rotational symmetry, is only shown as half a cross-section.
Figure 5:
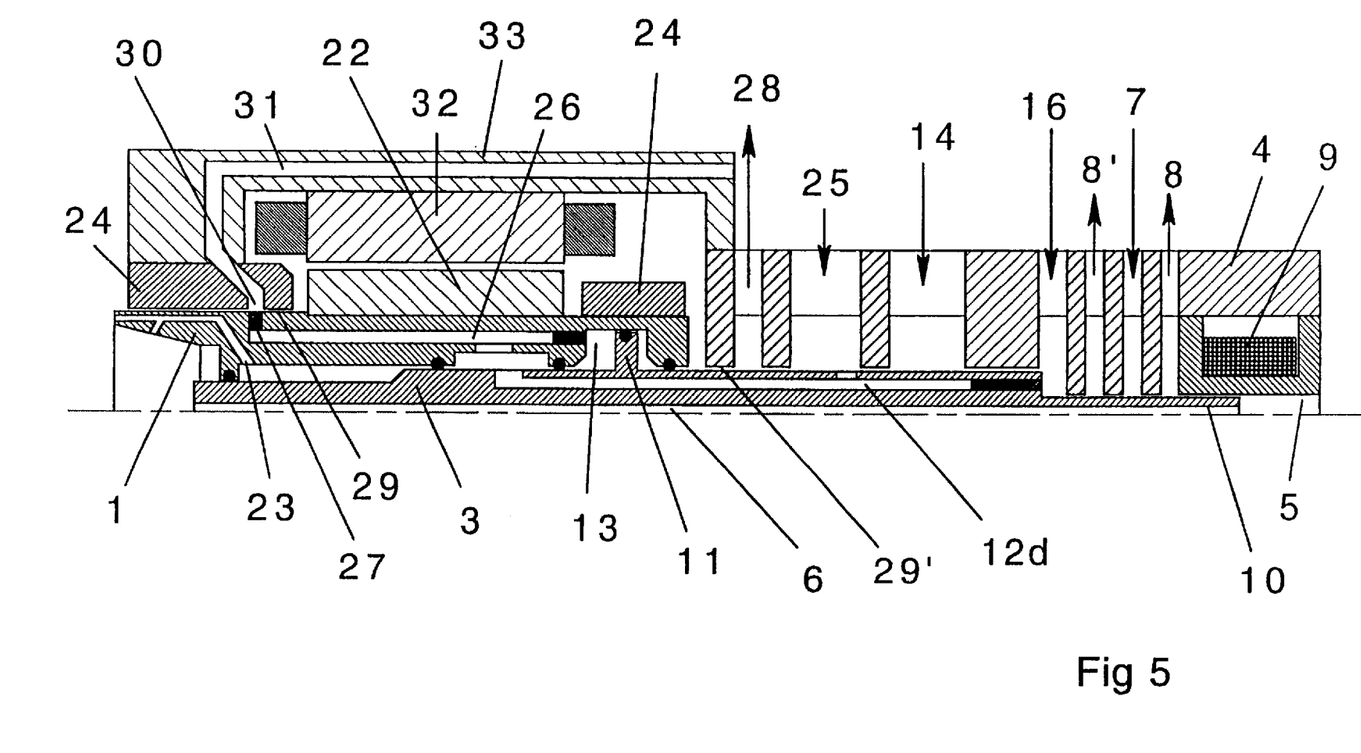
FIG. 5 shows another design of the invention in section.

The rotating spindle axle is designated by the reference numeral 1 and in the example shown in FIG. 1 is supported on two ball-bearings, indicated by the reference numeral 2, or alternatively on two fluid bearings 24 (FIG. 5). An axially displaceable pulling rod 3 extends in the center of the spindle axle 1. In a per se known manner and not shown in detail here, a tool (not shown) can be attached firmly at the spindle axle 1 by being attached to the pulling rod 3 that is axially displaceable in the spindle axle 1. At the opposite end of the spindle axle 1 to the tool, the pulling rod 3 extends into a unit 4 that is stationary in relation to the rotation of the spindle axle 1.

Cooling of the Tool

A connection for a cooling agent, indicated by the reference numeral 5, to which a tube or hose is connected through which a cooling agent, for example, an emulsion is pumped under pressure through a central bore 6 in the pulling rod 3 is arranged centrally at the stationary unit 4. The cooling agent exits the pulling rod 3 at the connection to the tool to cool the bits of the tool in a manner that is well known. The coolant is supplied, as stated, under pressure, which is why the coolant (fluid) will leak in the gap between the stationary unit 4 and the rotatable pulling rod 3 from the area with the fluid under pressure—the area before the inlet of the bore 6—to a first outlet 8, which has a lower pressure than the pressure of the supplied coolant. This gap, in forming a gap sealing, creates a pressure drop that constitutes a sealing function. As the gap is small, only an insignificant part of the total flow of the coolant will pass through the gap. During the rotation of the pulling rod 3, the fluid in the gap will act as a dynamic fluid bearing and form a radially stabilizing force on the rotating pulling rod 3. The fluid will also conduct away the heat of friction that is formed in the dynamic fluid bearing. In order that the fluid, when it reaches the outlet 8, shall not find a way in the gap along the pulling rod 3 and the stationary part 4, a gas, for example air (blocking air) is pressed through an inlet 7 distributed in a radial plane in the stationary unit 4, which results in that even this gas (air) finds a way in the gap towards the area with the lower pressure and thus against the leakage of fluid and towards the outlet 8, whereby the gas and the fluid that reach the area at the outlet 8 exit the stationary part 4 through this via a system of channels (not shown). In this context, it should be pointed out that inlet 7 and each and every one of the other openings included in the tool spindle described, are delimited axially on every side by means of gap sealings.

Such a gap sealing brings about:

1. A sealing function that works at high speeds of rotation without wear of the component parts;
2. A dynamic bearing of the pulling rod 3 achieving a radially stabilizing force;
3. Removal of the heat of friction that is formed in the dynamic bearing;
4. Prevention of different types of fluids mixing with one another; and
5. The leakage flow from the sealings is taken care of and returned to the respective pump unit.

Sensor for the Axial Position of the Connecting Rod

As indicated earlier, a tool is attached firmly to the spindle with the help of a pulling rod 3, that, when withdrawn into the spindle, locks the tool to it. To release the tool, the pulling rod 3 is pushed out a certain distance, whereby the tool can be removed. Significant damage and accidents can occur if the tool were to loosen from the spindle axle during its rotation. It is therefore of utmost importance that the tool really is tightly attached in the correct way to the spindle axle, which hitherto has been difficult to establish.

Figure 2:
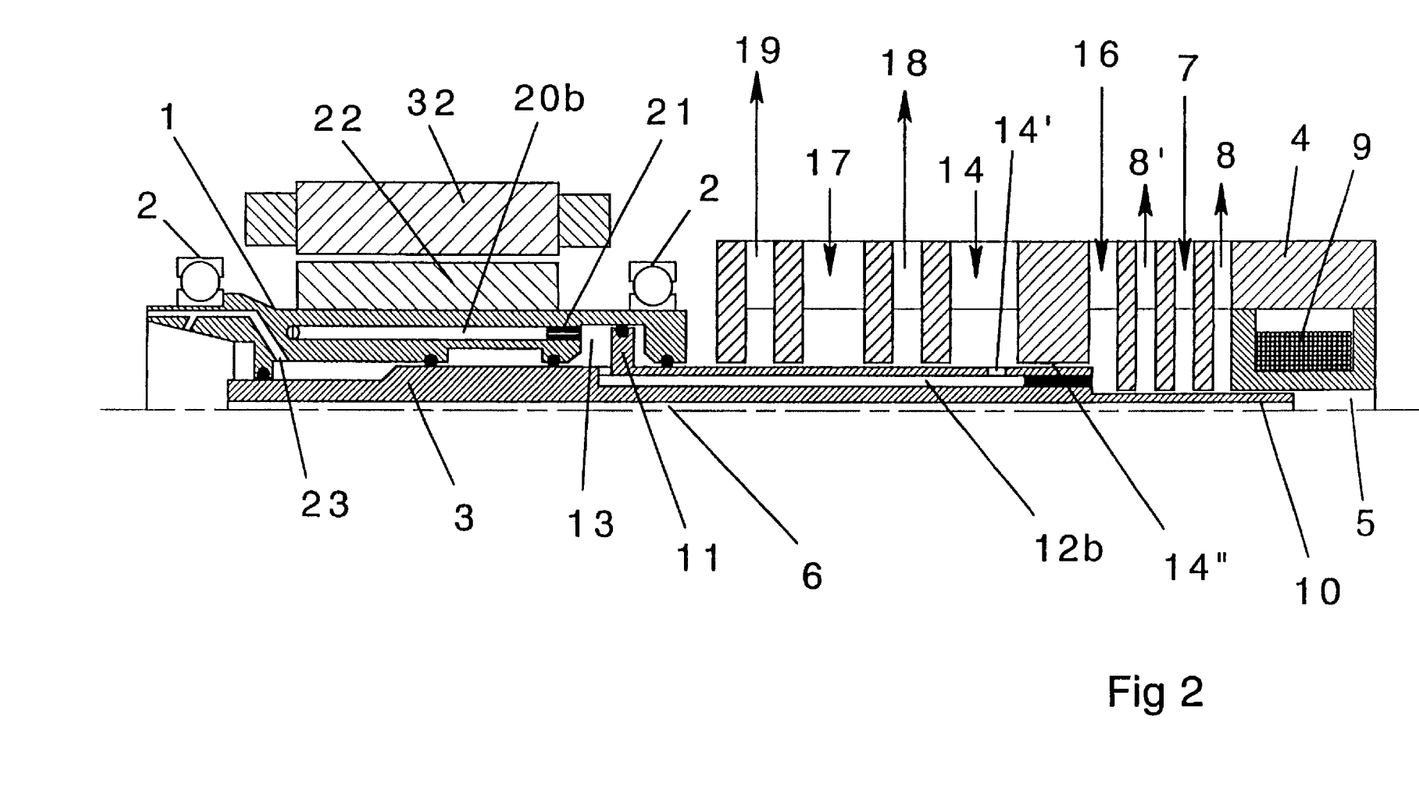

With the present invention, such as that shown in FIG. 2, it is possible to determine the axial position of the pulling rod 3 and thus also confirm if the tool is correctly attached to the spindle axle or not. For this purpose, unit 4 is equipped with a spool 9 into whose opening the end of the pulling rod 3 that is currently in unit 4 extends. The spool 9, which is stationary in relation to the axial displacement of the pulling rod 3, will generate different current flow depending on the axial position of the pulling rod in the spool 9. Depending on that the axial position of the pulling rod in the spool 9, this, with this belonging and due to the position, specific current flow makes it possible to determine with sufficient precision the axial position of the pulling rod and thereby establish limits for when the tool can be replaced, respectively when the tool is correctly attached to the spindle axis and can be utilized. To reduce the sensitivity to disturbances due to the influence of the surrounding, the signals carrying the information about the position of the pulling rod 3 are led in optical fibers to a unit outside of the spindle, for example, a computer or other control equipment, for example in the case that the actual data unit is situated in the spindle axle 1, for transformation to accessible information with the aid of per se known technology. In this context, it should be realized that spool 9 can in principle surround pulling rod 3 at any location, as long as the pulling rod at this location has a significant change of material. Within the scope of the invention, it is, of course, possible to use more than one spool 9.

Hydraulic Attachment and Removal of the Tool at the Spindle

FIG. 1 shows a tool spindle 1 from which it is evident that the pulling rod 3 is provided and integrated with a piston 11. In addition to the central bore 6, the pulling rod 3 also has bores 12a, b, c (FIGS. 1–3) distributed around the center.

The piston 11 is displaceable in a cylinder chamber 13 that is accommodated in the spindle axle 1. In the position shown in FIG. 3, the pulling rod 3 is withdrawn in the spindle axle 1, thereby firmly holding the tool (not shown). To remove the tool in this position, hydraulic fluid is supplied under pressure through an inlet 16 at unit 4 and led into at least one first bore 12a of the pulling rod 3, which opens adjacent to the inlet 16. The gas under pressure, supplied through inlet 7, as previously discussed, seeks a passage through a gap sealing also towards the left (as seen in the Figures) and out through an outlet 8'. By means of this outlet 8' and the gap sealing to the left of this, the area pressurized via inlet 16 is limited as the fluid together with the gas (blocking air) exit unit 4 via outlet 8'. The hydraulic fluid is led via the bore 12a into the cylinder chamber 13 on the right-hand side of piston 11 (according to FIG. 1) and forces the piston 11 to the left. The pulling rod 3 will thus be displaced to the left, allowing the removal of the tool.

At least one second bore 12b, which is not the same as previously named in connection with opening 16 and which is sealed off at the end adjacent to opening 16 (FIG. 2), is provided with one or more openings 14' distributed peripherally in a radial plane and always located in communication with an inlet 14 of unit 4 that is divided in a radial plane and axially separated from inlet 16 by a gap sealing 14". Hydraulic fluid under pressure is supplied to the inlet 14 (whereby inlet 16 naturally is not under pressure) and is led via the second bore 12b into the cylinder chamber 13 on the left-hand side of piston 11 (according to FIG. 2) forcing the piston 11 to the right, thereby displacing the pulling rod to the right for tightening the tool. The pulling rod 3 is held in this position by the pressurized hydraulic fluid continuously acting on the left-hand side of the piston. As has been previously mentioned in connection with the coolant liquid, the hydraulic liquid will also leak in the gap sealings between unit 4 and the pulling rod 3 both to the right and to the left when seen in the figure. The pressurized fluid provided through inlet 14 is restricted to its left (FIG. 2) by a gap sealing as well as an outlet 18 or a channel with atmospheric pressure and to the right of the gap sealing by the gap sealing plus the inlet 16, which as already mentioned is now not under pressure. Pressurized air (blocking air) is also provided through an inlet 17 of unit 4 that is divided in a radial plane, which also prevents further leakage of hydraulic fluid to the left (in the figure) and that together with the leaking hydraulic fluid, exits unit 4 via outlet 18. To reduce or prevent leakage of pressurized air from inlet 17 into the actual spindle, an outlet 19 with a lower pressure (atmospheric pressure) is arranged to the left of inlet 17.

Bore 12a is open at the inlet 17 and opens to the right of piston 11, while the second bore 12b is provided with openings 14', is sealed at the end adjacent to inlet 16, and opens in the cylinder chamber 13 on the left-hand side of the piston.

In the case where fluid bearing 24 is used, see FIG. 5, and the spindle has the design shown there, the hydraulic fluid is led under pressure through inlet 16 and bore 12a to detach the tool. To attach the tool firmly, bore 12b is put under pressure via inlet 14 to displace piston 11 to the right in the figure. In this way, the hydraulic fluid situated to the right of the piston to be found in the bore 12a is pressed out through the now depressurized inlet 16. When detaching the tool, the reverse takes place and the hydraulic fluid is pressed out through the now depressurized inlet 14.

Cooling the Spindle at the Connection to the Rotor

The tool (not shown) is attached firmly, as stated, by the displacement of the pulling rod 3 into the tool spindle, which takes place through the hydraulic fluid under pressure being supplied via inlet 14 of unit 4 through the second channel 12b to the cylinder chamber 13 on the side of the piston facing the tool, as shown in FIG. 2. Spindle axle 1 is, as shown, provided with a number of axial channels 20a, b distributed peripherally, for example twelve channels (see FIG. 6), that open into the cylinder chamber 13. Six channels 20b of these twelve channels have restrictions 21 at the connection with the cylinder chamber 13 for maintaining the pressure in the cylinder chamber 13 and for controlling the desired amount of flow in the channels 20a, and they are, at the opposite ends to their restrictions, connected with the other six channels 20a, that are plugged tight 21' at the cylinder chamber 13. Instead, these latter six channels 20a open at the first bore 12a of the pulling rod 3, which is inactive under these conditions, to lead away the hydraulic fluid via the inlet 16 that is inactive while the tool is attached.

Figures 4, 6, 7:
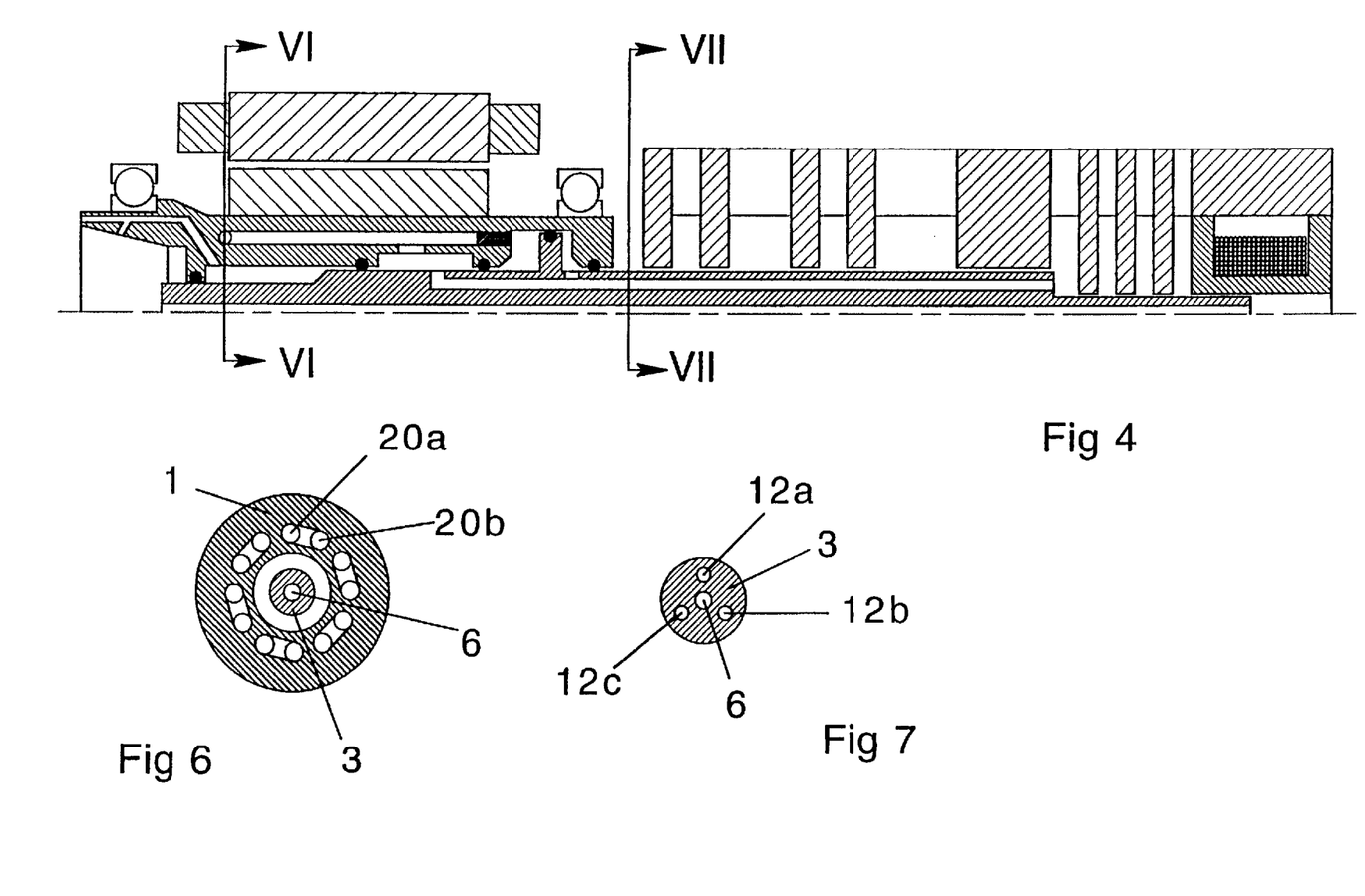
FIGS. 6 and 7 shows cross-sections through the spindle axle along lines VI and VII in FIG. 4.

As long as the tool is attached and pressurized fluid thus acts against the left-hand side of the piston 11, part of the fluid will flow via the restrictions 21 through the channels 20b in the spindle axle 1 and on back through the channels 20a, the first bore 12a and out via the inactive inlet 16, thereby cooling the spindle axle and the rotor 22 located on the outside of the spindle axle 1, which is part of the motor 32 for driving the spindle. During the detachment of the tool and the displacement of the pulling rod 3 to the left in the figure, the hydraulic fluid will change direction of flow and similarly cool the spindle axle 1.

Scavenging Air for Blowing Clean the Tool

Figure 3:
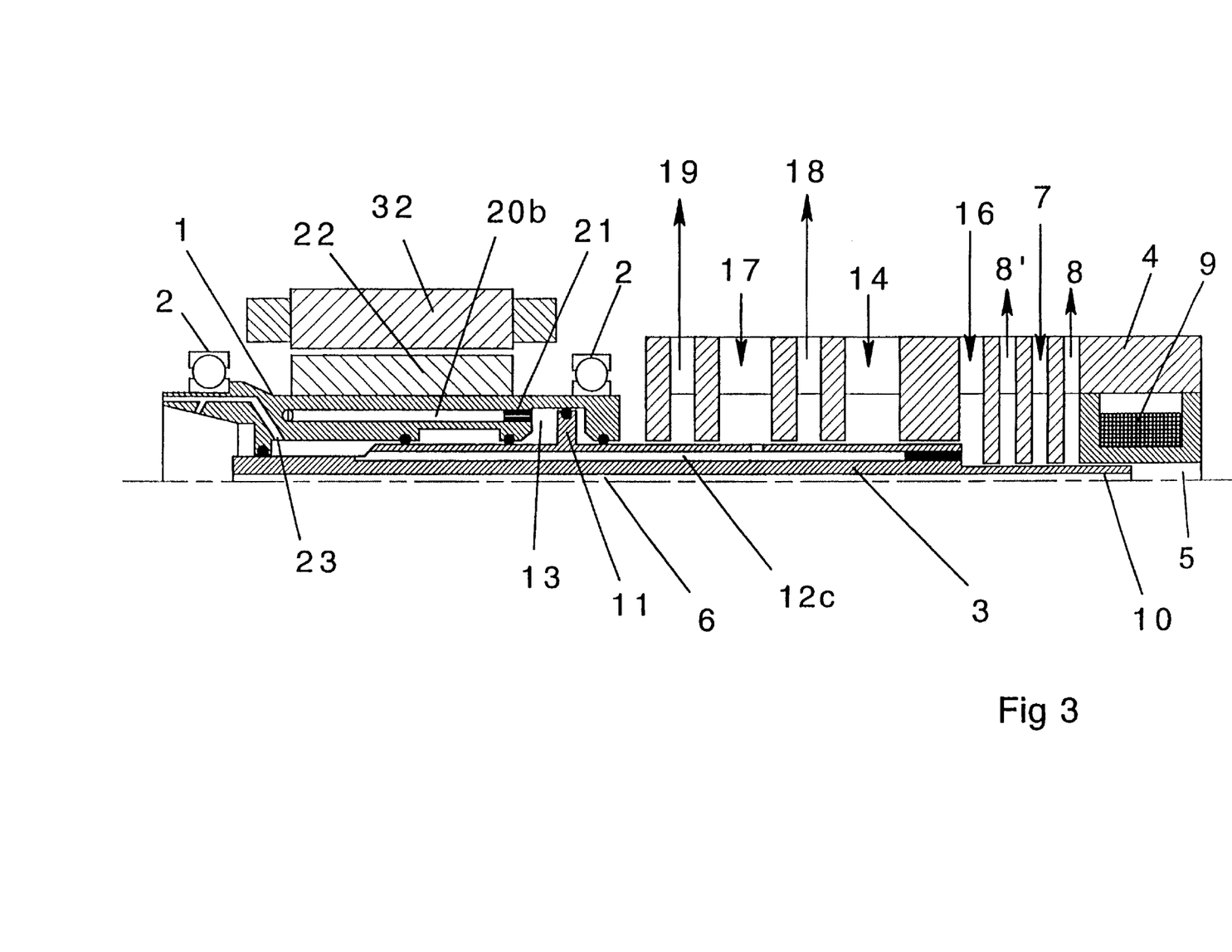

The pressurized air inlet 17 of unit 4, shown in FIG. 3 divided in a radial plane, with continuous pressurized air switched on during use is connected to at least a third bore 12c of pulling rod 3, which is plugged tight at its right-hand end of FIG. 3. When the pulling rod 3 is displaced to the left for detaching the tool, the pressurized air, here referred to as scavenging air, will automatically be led out by one or more third channels 23 in the spindle axle 1, towards the tool end of the spindle for blowing clean, in the accepted manner, the abutting surfaces of the tool cone. During attachment of a tool through the withdrawal of the pulling rod 3, the flow of pressurized air will be automatically broken through the tool with cone and flange sealing channels 23.

Cooling the Spindle Axle and thus the Rotor of a Fluid-supported Tool Axle

FIG. 5 shows the invention applied to a tool spindle 1 supported by a fluid bearing schematically shown and indicated by 24. In principle, this embodiment can be said to correspond to that described previously in connection with ball-bearings with the difference that the channels 20b do not open in the cylinder chamber 13 but are, for example, tightly plugged at this. Coolant water is introduced via unit 4 through an inlet 25 divided in a radial plane and into the bores 12d of pulling rod 3, which are tightly plugged at their right-hand ends in the figure, and led via these bores 12d into the cooling channels 26 equally distributed around the center axis of the spindle axle 1. The ends of the outlets of the cooling channels 26 are provided with restrictions 27 to obtain the desired level of flow in the channels 26 and draining of cooling water from the spindle axle 1 at the channels 26. In this case, with the use of fluid bearings, the spindle is surrounded by an atmosphere under pressure, e.g. continuously supplied pressurized air, enclosed in a housing 33, i.e. air under pressure is thereby continuously introduced in gap sealing 29' between the pulling rod 3 and unit 4, which means that cooling water leaking in the gap is prevented from forcing its way out into the said gap but is instead collected in an outlet 28 for onward transport from unit 4.

Similarly, air under pressure is supplied to a gap sealing due to the pressurized housing 33 around the spindle axle 1, to prevent fluid that has left the left-hand bearing 24 or the coolant that has passed the restrictions 27 in the spindle axis, from being forced in via this gap. The fluid is collected in space 30 to, together with the blocking air, be led out from the spindle unit via several channels 31 that also cool the stator in the spindle. Fluid leakage from the right-hand fluid bearing is collected in channels on either side of the bearing and drained, due to the pressure in housing 33, via lines (not shown) to the outside of the housing, e.g. through connection to channels 31.

System of Supply

One problem with a spindle according to that described and that uses a fluid (liquid, gas) as a significant means for its function is to achieve a large degree of reliable operation and ensure that the fluid meets its intended function with the desired volume and pressure.

During disturbance to the monitoring and control systems, or malfunction of the fluid supply to the spindle, it is necessary that the spindle axle be stopped before the disturbance or malfunction leads to damage or becomes a risk for the operation of the spindle.

A secure function of the described spindle can be achieved through the supply of fluid for the respective function taking place through supply channels that are independent of one another, especially through the most sensitive sections, for example where flexible connections are required.

With the aid of pressure and flow monitors, it is possible to continuously monitor the different functions, i.e. pressure and flow in the respective channel, so that the values fall within the desired limits. It is thus possible that when the spindle does not rotate and an indicator shows that the desired value does not fall within its limits, or that the indicator shows that the monitoring units are not functioning, the spindle cannot be started. If the signals show that the value affected does not fall within the desired limits during the operation of the spindle, or that the monitoring units are not functioning, the spindle is switched off. In this case, it is important that an emergency system is readily available to allow the spindle to come to a standstill by itself before the supply of fluid ceases.

During disturbances in the system, it is very important that the spindle can be stopped and that it shall thus be possible to remove the fluid from the locations where fluid can spread in an uncontrolled manner and cause damage in that the active control of the location of the fluid ceases.

Figure 8:
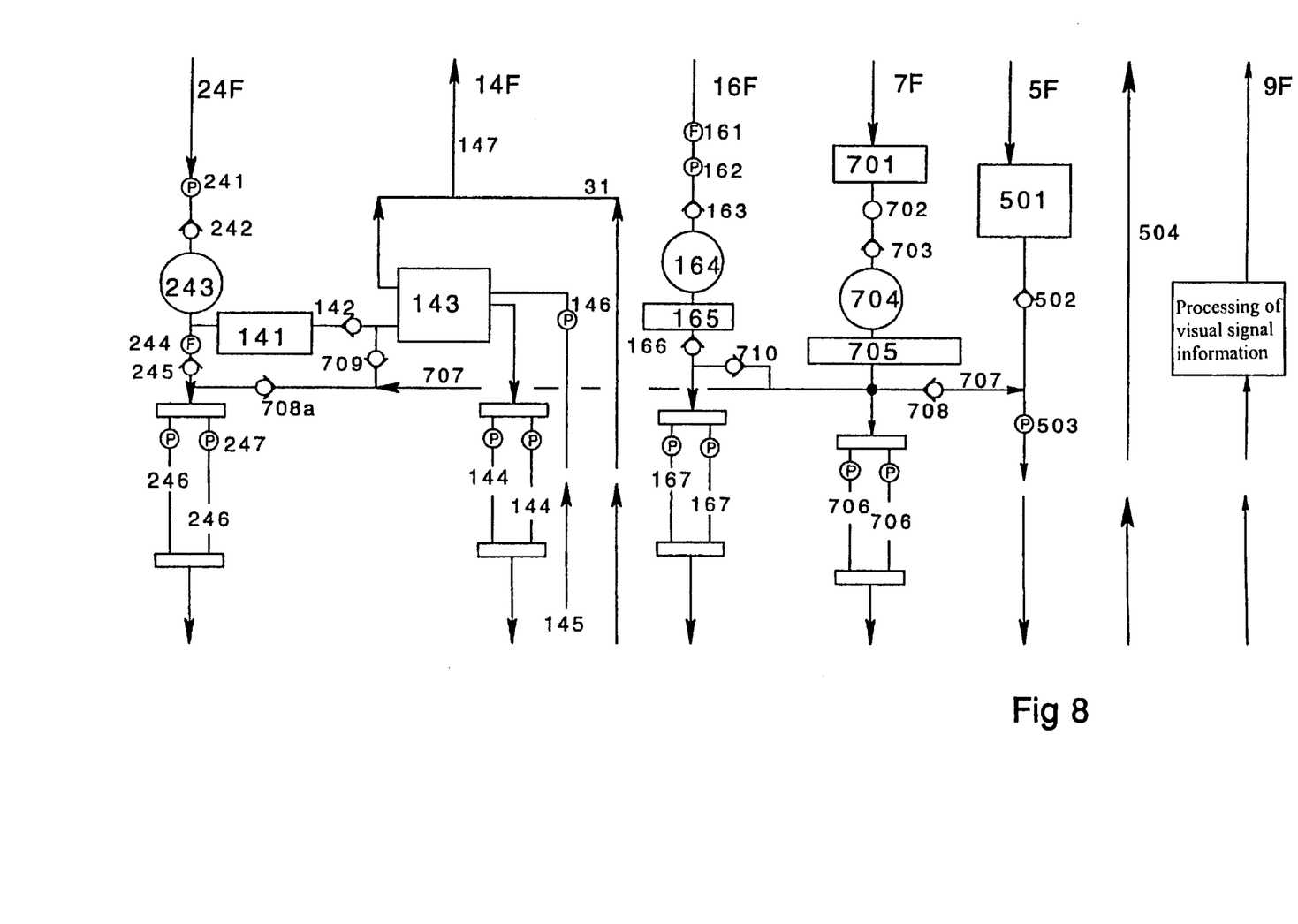
FIG. 8 shows schematically the supply unit connected to the spindle according to the invention.

FIG. 8 shows schematically the supply unit according to the invention, designated by F, for the functional supply of the tool spindle, which as according to that described previously, includes the spindle axle 1 and its ball-bearings 2 respective fluid bearings plus the gap sealings that are included.

The receiving and processing system 9F for the current flow or optical signals from the spool 9 at the tool spindle, with the aid of which the axial position of the pulling rod 3 can be determined, is shown on the right in FIG. 8.

To cool the tool, a coolant fluid with a pressure of 10–140 bar is fed to the tool cooling system 5F, which consists of, when viewed in the direction of flow, a cut-off valve 501, a check valve 502 and a pressure monitor 503, which senses that the said pressure falls within predetermined limits. Coolant fluid fed to the tool spindle that has passed gap sealing is led away and is indicated symbolically with the arrow 504.

Protective air or blocking air with a minimum pressure of 6 bar is fed to inlet 7 via a cut-off valve 701 in the blocking air pathway 7F plus a pressure monitor 702, a check valve 703, an accumulator 704 and a regulator 705, the latter of which adjusts the outgoing pressure to desired pressure. The line from regulator 705 connects with at least two supply channels 706 that are independent of one another, each having a pressure monitor, and connected to inlet 7 of the tool spindle. Pressure monitor 702 monitors that the correct pressure prevails in circuit 7F. In the accumulator 704, there is a certain amount of air accumulated with a pressure of 6–7 bar. If the blocking air disappears, the pressure drop is sensed by the pressure monitor 702 and the accumulator 704 in circuit 7F is automatically connected, at the same time as a signal that the supply of energy for the operation of the tool spindle is to be interrupted is emitted. The accumulator is emptied successively and has a capacity that allows removal of fluid from locations, where it is not desired, the whole time up to and following the stoppage of the spindle.

For cooling the spindle—rotor 22—coolant is supplied via circuit 16F with a pressure of, for example, 6 bar. This circuit includes, in the order of the direction of flow, a flow monitor 161 that senses that a sufficient level of flow exists in the circuit, a pressure monitor 162 according to that stated earlier, a check valve 163, an accumulator 164, a regulator 165 plus a check valve 166, before this circuit connects to or feeds two supply channels 167 that are independent of one another, each having a pressure monitor and connected to the inlets 14, 16 of the tool spindle. Accumulator 164 holds a certain amount of fluid with a pressure of 6–7 bar. This accumulator 164 acts in principle in the same way as accumulator 704 in the circuit 7F and thus is responsible for that the spindle—rotor 22—is supplied with coolant fluid for as long as the spindle rotates. The regulator 165 adjusts the outgoing pressure to the desired pressure, for example, 6 bar. The coolant fluid exits the spindle via channel 31 (see also FIG. 5).

The feed system 24F for supplying fluid to the fluid bearing 24 of the tool spindle is shown furthest to the left in FIG. 8. The fluid is supplied to the system with a pressure of, for example, 100 bar and flows through a pressure monitor 241, a check valve 242, and accumulator 243, suitably a flow monitor 244, a check valve 245 to be then led to the spindle via at least two supply channels 246 that are independent of one another and include a respective pressure monitor 247. The different components have in principle a function that is equivalent to that previously described in connection with system 7F and 16F. The task of the flow monitor 244 is to register that the correct amount of fluid—flow—passes.

Hydraulic circuit 14F is arranged for adjusting the hydraulic system, for the pressure-setting of the different sides of the piston 11 for attaching or removing the tool. A branched line, to which a regulator 141 and a check valve 142 is connected, is arranged after the accumulator 243 in circuit 24F and before the flow monitor 244, after which the branched line connects to a multi-way valve, a so-called four-two valve or cross-parallel valve 143. The regulator is adjusted to a pressure of, for example, 60 bar. The pressurized hydraulic fluid is led out via valve 143 through at least two supply channels 144 that are independent of one another and provided with pressure monitors, and in via the inlet 14 of the tool spindle for displacing the piston 11 to the right (see FIG. 1) and attaching the tool. During this process, the line 145 connected from the valve 143 to the inlet 16 of the tool spindle is not under pressure so that the hydraulic fluid can be led away. To remove the tool, the valve 143 is turned so that pressure is released from the connection 144 and the line 145 is pressurized. To sense that the line 145 has the desired pressure, a pressure monitor 146 is arranged in the line. The return of the said fluid is led away via line 147.

Part of the branched line 707 connected to system 5F between check valve 502 and pressure monitor 503 extends from system 7F after its regulator 705 via check valve 708. Another part of the branched line 707 connects to system 24F upstream of its supply channels 247 via a check valve 708a. Branched line 707 also connects to valve 143 of system 14F via a check valve 709, and similarly via a check valve 710 to system 16F downstream of its check valve 166.

If, for example, a malfunction occurs in system 5F and the pressure in this falls below 4 bar, for example, which is the pressure prevailing in branched line 707, and the spindle axle stops, air from system 7F with an initial pressure of 4 bar will flow from system 7F into the bore 6 of the spindle axle to remove the coolant fluid from the affected parts of the spindle axle and to, to a certain extent, contribute to the cooling of the tool. Check valve 708 will naturally prevent the coolant fluid in system 5F forcing its way into branched line 707.

In the equivalent way, if the pressure in system 4F falls below 4 bar, or if another fault arises and the spindle stops, air from system 7F will open check valve 710 and force away the fluid currently prevailing in the spindle and, to a certain extent, contribute to the cooling of the tool.

The equivalent applies during an unauthorized pressure drop or other malfunction to feed system 14F via check valve 709 and valve 143, and/or feed system 24, during malfunction, via check valve 708a with pressurized air from system 7F to remove fluid that is not appropriate there.

The pressure and flow monitors signal when the prevailing values lie outside of the intended limits and cut off the supply of energy to the spindle axle.

Alternative Embodiment

The invention described here is not limited to exactly the design described as the tool spindle can naturally be given another construction. For example, the spindle axle 1 can extend into and be accommodated by the stationary part 4, whereby the gap sealings will be located between this and the spindle axle 1. In this case, it is possible to position the axial bores 12a, 12b for hydraulic fluid in the spindle axle 1 instead of the pulling rod 3.

The pressures specified in connection with the described supply system are appropriate but are given only as examples and can naturally vary depending on different parameters. Parts 244–247 do not apply when ball-bearings are used and instead, the system has lubricant monitoring of the ball-bearings added to it.

Similarly, it should be emphasized that the schematically indicated ball and fluid bearings 2 and 24 respectively have what is a per se known axle bearing function, which has been omitted in order not to make the description and drawings more complicated than necessary.

What is claimed is:

1. Arrangement for delivery coolant fluid in a tool spindle, the arrangement comprising:
    (a) a rotating part of the tool spindle intended to support a tool at one end, the rotating part has an axial bore extending entirely therethrough; and
    (b) a stationary unit accommodating an end of the rotating part that is opposite the tool, the stationary unit is stationary in relation to the rotating part, the stationary unit has a cooling fluid inlet for introducing coolant fluid under pressure to the axial bore of the rotating part, the stationary unit and the rotating part are separated by a gap adjacent to the cooling fluid inlet thereby forming a dynamic bearing during the rotation of the rotating part due to leakage of coolant fluid through the gap.

2. Arrangement for delivery coolant fluid in a tool spindle, the arrangement comprising:
    (a) a rotating part of the tool spindle intended to support a tool at one end, the rotating part has an axial bore; and
    (b) a stationary unit accommodating an end of the rotating part that is opposite the tool, the stationary unit is stationary in relation to the rotating part, the stationary unit has a cooling fluid inlet for introducing coolant fluid under pressure to the axial bore of the rotating part, the stationary unit and the rotating part are separated by a gap adjacent to the cooling fluid inlet thereby forming a dynamic bearing during the rotation of the rotating part due to leakage of coolant fluid through the gap, the stationary unit is provided with a gas inlet for introducing gas to the gap between the stationary unit and the rotating part, whereby the stationary unit is provided with an outlet connected with the gap and located between the cooling fluid inlet for coolant fluid and the gas inlet for the gas, and which has a higher pressure than that prevailing in the outlet.

3. Arrangement according to claim 2, wherein, in order to firmly attach the tool, the rotating part includes a moveable pulling tool that is axially displaceable in a spindle axle, an end of the pulling tool is located in the stationary unit, the axial bore is arranged in the pulling tool and opens into the end of the pulling tool located in the stationary unit.

4. Arrangement according to claim 3, wherein the gas is air and the coolant fluid water.

5. Arrangement according to claim 2, wherein the gas is air and the coolant fluid water.

6. Arrangement according to claim 1, wherein, in order to firmly attach the tool, the rotating part includes a moveable pulling tool that is axially displaceable in a spindle axle, an end of the pulling tool is located in the stationary unit, the axial bore is arranged in the pulling tool and opens into the end of the pulling tool located in the stationary unit.

\* \* \* \* \*